United States Patent [19]
Dethloff

[11] Patent Number: 5,811,771
[45] Date of Patent: Sep. 22, 1998

[54] METHOD AND SYSTEM FOR PAYING WITH A PORTABLE DATA MEDIUM HAVING SECURITY AGAINST OVER CHARGING AND UNAUTHORIZED USE

[76] Inventor: Juergen Dethloff, Elbchaussee 177, D-22605 Hamburg, Germany

[21] Appl. No.: 651,754

[22] Filed: May 22, 1996

[51] Int. Cl.$^6$ .................................................. G06K 5/00
[52] U.S. Cl. ...................... 235/380; 235/375; 235/379; 235/492; 902/26
[58] Field of Search ................................. 235/380, 375, 235/379, 492; 902/25, 26

[56] References Cited

U.S. PATENT DOCUMENTS

| | | | |
|---|---|---|---|
| 4,454,414 | 6/1984 | Benton | 235/380 X |
| 4,614,861 | 9/1986 | Pavlov et al. | 235/380 |
| 4,634,845 | 1/1987 | Hale et al. | 235/380 |
| 4,766,293 | 8/1988 | Boston | 235/379 |
| 4,837,422 | 6/1989 | Dethloff et al. | 235/380 |
| 5,521,362 | 5/1996 | Powers | 235/380 |

FOREIGN PATENT DOCUMENTS

89/02140  3/1989  WIPO .

Primary Examiner—Donald T. Hajec
Assistant Examiner—Michael G. Lee
Attorney, Agent, or Firm—Notaro & Michalos P.C.

[57] ABSTRACT

A data medium in the form of a check card is known. Such check cards include a memory in which at least one amount of money is stored. If the user wishes to purchase or use a product or service, the amount of money is debited by the vendor. If the vendor intents to defraud the user, or simply makes an unintentional error, too much money may be debited from the data medium without the user noticing immediately that this has occurred. This type of fraud or error may also occur when using other data mediums, including credit cards, debit cards, special purpose cards such as telephone cards and transportation cards, and the like. In order to avoid such fraud or error, further memories are provided in the data medium according to the present invention, wherein one internal memory serves solely for the purpose of accepting amounts of money from outside. With the aid of a small terminal which the user carries with him, together with the data medium, an amount corresponding to the cost of a product or service can, for example, be transmitted from the memory, which serves to accept amounts from outside, to an externally accessible memory. Since from outside, amounts can only be deducted from this externally accessible memory, it is impossible for erroneous or fraudulent amounts to be deducted from the data medium. Several externally accessible memories can be provided.

20 Claims, 4 Drawing Sheets

METHOD AND SYSTEM FOR PAYING WITH A PORTABLE DATA MEDIUM HAVING SECURITY AGAINST OVER CHARGING AND UNAUTHORIZED USE

FIELD AND BACKGROUND OF THE INVENTION

The present invention relates to a method and system for paying vendors for goods and/or services by means of a portable data medium comprising a memory and a control unit. Data are stored in the memory which preferably represent amounts of money or number of value units. In order to write such data representing total amounts of money or units available, the user establishes an operative connection with a crediting terminal through a data carrier, for example the user's bank through a connection via electrical contacts or in a contactless manner. Such connection can, for example, be via an electrical or other contactless means. The terminal initiates a writing process and debits the account of the user for the appropriate amount while crediting the user's data medium. Examples of the data medium are check cards, debit cards, and the like. This corresponds to withdrawing cash from the bank, with the difference that the cash now is directly available to the user not in the form of bank notes but as "electronic money". If the user wants to avail himself of a product from a vendor, for example for the purchase of goods or the use of a service, the user establishes a connection between his data medium and the vendor terminal. This can also take place via contacts or in a contactless manner. The vendor terminal than debits the amount of money or value unit or units corresponding to the desired product or service from the memory of the data medium and simultaneously credits the account of the vendor with this amount, preferably transferring it to a memory in the vendor terminal. The transition of the electronic money can take place as anonymously as the handing-over of bills, i.e. the memory of the vendor stores only the amounts of money, not however, information about the data medium from which the individual amounts of money have originated. This anonymity is due to the need for data security and privacy for the user.

When moving electronic money from the user's data medium into the memory of the vendor terminal, the amount of the money or units which are to be transferred, must be indicated. This takes place conventionally through fixed standard amounts, such as, for example, in vending machines or automatic ticket machines or ticket cancelers or by entering the amount, for example, using keys on the vendor terminal, which is carried out by the vendor. It is, in principle, possible for the vendor to enter a higher amount than that authorized by the user or holder of the card or medium, i.e. the customer. It is also possible for the terminal to be manipulated by the vendor in such a way that a higher amount is actually transferred from the data medium than is, for example, displayed at the vendor terminal. This can not practically be checked by the user of the data medium and subsequent proof is only possible in very involved ways. This causes uncertainties in the mind of the user when using the medium and differs from the case in which a product is paid for with cash. This represents a significant disadvantage when using electronic money.

U.S. Pat. No. 4,859,837 discloses a portable data medium comprising several separate memories from which amounts of money can be transferred to the outside with the memories being allocated to different accounts of the medium user. Transferring an amount of money to the outside is, however, only possible if previously a secret number has been entered into the medium by the user. Only one of the memories is not allocated to an account and accessible from the outside without entering a secret number. This known medium comprises a battery and further a display unit and buttons with which a secret number and also an amount of money can be entered in order to transfer this amount from one of the memories that is protected by the secret number, to the outside or into the unsecured memory. Due to the battery, the display unit and the buttons, the data medium can hardly be as small as a check card or other like medium. The data medium cannot be produced in a cost-effective manner, and the various possibilities of debiting from one of the memories requires a cumbersome operation and a complicated control. German patent document DE 44 41 413 A1 describes a data exchange device with portable data medium comprising a memory for storing an amount of money. From this memory amounts of money can only be deducted after a secret number has previously been entered. Only payment of relatively small amounts of money is possible without a secret number and the maximum sum of the deductible relatively small amounts of money is defined. An unauthorized user who does not know the secret number can thus use only this maximum sum of money so that the damage is limited. The maximum sum, however, is defined in the data medium so that it cannot be changed and for meaningful use it cannot be selected to be so low such that when an incorrect, e.g. higher amount is deducted, noticeable damage still occurs to the legitimate owner. The use of an additional money memory in the medium, from which amounts of money can be deducted without a secret number thus, for various reasons, is not practical.

A system by the name MONDEX is known, in which a user has an electronic device in the approximate form of a wallet. The device comprises a display and a relatively large number of buttons as well as a memory. In this memory data representing amounts of money are stored. The electronic wallet further comprises a receiver for a portable data medium in the form of a chip card which also includes a memory. After the data medium is inserted into the receiver of the wallet, a selectable amount of money can be deducted from the memory of the device through the actuation of buttons and transferred into the memory of the data medium. The data medium can be used like cash if the vendor has a corresponding terminal with which amounts of money can be deducted from the data medium. If the wallet in which relatively large amounts can be stored, is, for security reasons, kept at a selected location, for example in the home of the user or owner, a greater amount of money is customarily transferred into the data medium than is required for paying for a single product. For that reason, this system represents an uncertainty for the user with respect to an erroneously or fraudulently acting vendor, just as in the case of a check card into which amounts of money are directly transferred from a bank in the form of data. The MONDEX system is furthermore cumbersome to handle.

SUMMARY OF THE INVENTION

It is the task of the present invention to provide a method and system for paying for products and/or services, which is simple in its application and in which the same terminals can be used for deducting amounts of money or units, as is the case for known cards and other known mediums, with a money or credit memory. In this system the amounts of money or credits contained in the data medium are significantly better protected.

To achieve this task, a small pocket device (first terminal) with a display and keys is used with a data medium which does not include any operating keys or display elements and in which, exclusively, at least one first memory or memory section is accessible from outside, while a second memory or memory section can only accept amounts of money from outside. The second memory holds these amounts available and can transfer them within the data medium, into the first memory or one of the first memories. This provides especially good protection for the amount of money or value units stored in the second memory. In the following, this second memory is therefore also referred to as an internal memory and the first memory as a further memory. To use as a data medium, e.g. a card in accordance with the ISO standards, the data medium does not comprise any operating elements; thus transfer of the money into the further memory takes place with the aid of a special user terminal, referred to in the following as a first terminal, which can, however, be very simply implemented and comprises preferably a battery also for the energy supply of the portable data medium. It is sufficient that the first terminal can receive the data medium so far that a connection can be established via contacts or in a contactless manner, and, in addition, only very few operating elements on the first terminal are required since it serves only few simple functions, namely essentially to transfer data representing an amount of money or units to be spent from one memory into another. When the data medium is subsequently inserted into the terminal of a vendor, the vendor terminal can only deduct amounts of money needed or units from the further memory and, if the user has previously only transferred the precise amount of money needed into the further memory, it is therewith ensured that no amount of money greater than this is unintentionally or fraudulently transferred from the data medium. With the method according to the invention, the user has the same certainty as is the case when paying with cash, i.e. the user has direct control of how much money is deducted or transferred from the data medium by the vendor. The vendor is thus paid so to speak, with counted money. For a terminal of a vendor the data medium behaves in the same way as known data mediums that have only one memory, since control of the data medium according to the invention permits access for the purpose of debiting only the accessible or first memory.

It should be noted that in all cases in which the storage or transfer of an amount of money is discussed, other value units are also meant, which are stored or transferred as data. The quantities or the amounts of money or value units can be derived directly from the data or through any desired encryption via, for example, cryptological calculations and protocols connected therewith.

Use of the data medium by an unauthorized person which has, for example, found or stolen the data medium, is in general prevented by known methods through the use of a PIN. However, the further memory is accessible from outside without the use of a PIN. Therefore any amount available in a further memory can also be fraudulently deducted. In the method according to the invention improper use can also be readily prevented in that the only available amount is that amount that was transferred by the user using the first terminal from the internal memory into the accessible or further memory. For this purpose, for example, in the user's first terminal and in the data medium, corresponding secret codes are stored and the transfer from the internal memory into the further memory takes place only if a verification of such code(s) is made in the data medium and possibly in the first terminal as well. The transfer of the amount of money from the data medium to the vendor terminal or to the account of the vendor can then take place without further protection. The secret codes in the data medium and in the first terminal can be generated in such a way that both elements are only given out together from a bank and the codes are subsequently written in during the production of the two elements. Alternatively, when first using a new data medium with a new first terminal, the code, validation information or first secret information, can automatically be transferred from the data medium into the terminal—or visa versa—and can be stored there directly or after conversion via a secret algorithm. But this should only be possible once and must at least in the data medium be blocked against a repetition since otherwise security against fraud in the event of loss or theft of the data medium is no longer provided only in the event that, for example, an already assigned user terminal is lost and another first terminal is to be assigned, can it be provided that a special code known to the user and, for example, agreeing with his personal secret PIN, is entered and checked for correctness in the data medium and subsequently activates the output of the code from the data medium to the new user terminal. To increase security the number of times this process is activated is limited to a low value so that when the number of times the data medium is connected to another first terminal is exceeded, no code is any longer output from the data medium to the terminal.

In this disclosure, terms like "his", "he" and "himself" are meant to include "her", "she" and "herself". The term "product" includes goods and services.

In principle it can be provided that the data mediums used in the method according to the invention are constructed so that before the first connection of a data medium to a first terminal, the further memory is coupled with the internal memory so that, in that case, the internal memory is directly accessible. In the process the amount of money contained in the internal memory would not be protected unless access is only permitted after entering a secret number. In each case, the data medium responds to any second terminal always in the same way as a conventional data medium.

Entering an amount of money to be transferred from the internal memory to the further memory can take place so that in the data medium an input memory is provided into which the desired amount of money is initially entered. Only following a confirmation signal of the first terminal is this amount of money or are the corresponding data transferred from the internal memory into the further memory. If an amount of money has been entered via the first terminal, the data medium can be temporarily separated from the first terminal before entering the confirmation signal. This permits the entry of the amount of money during a quiet phase while, for the confirmation signal, only a very simple actuation of the first terminal is necessary and the amount of money entered in the input memory is nevertheless protected against improper deduction until the confirmation signal is received.

Even more favorable is the use of an input memory if an amount of money can be entered into the input memory in the data medium by a second terminal (e.g. the vendor terminal). This avoids possible errors in keying in a number and allows the user to simply press an "OK" key if the amount displayed is correct. The customer who, for example, wishes to buy an item, establishes an operative connection between his data medium and the vendor terminal, either via contacts or, even more usefully, in a contactless manner via an electrical field, or other contactless means and the amount of money displayed by the vendor terminal is written into the input memory of the data medium. This input process can, for example, be initiated by a corresponding signal from the vendor terminal or it can automatically be effected by the vendor terminal in that the further memory is found to be empty or not sufficiently filled. The vendor terminal will read that the input memory is empty or at least is not sufficiently full for payment to the vendor terminal. The customer, i.e. the user of the data medium, now establishes contact between his data medium and his user terminal and reads on its display unit the amount of money indicated by the vendor terminal. If the user agrees with this amount, he enters the confirmation signal and only then is this amount of money transferred from the internal memory into the further accessible memory, and only this amount of money can subsequently be deducted by the vendor terminal, preferably through a further connection of the data medium to the vendor terminal via contacts. The procedures taking place are very simple and fast, at least as fast as payment with cash and the customer is certain of the amount of money actually transferred to the vendor with the entire payment procedure remaining entirely anonymous.

Instead of establishing contact of the data medium with the vendor terminal, it is also possible for the data medium to actively transfer the amount of money in a contactless manner, from a further memory into the vendor terminal. Since the data medium itself has no separate energy source, and fields emitted from the vendor terminal are not sufficient in most instances to provide the data medium with sufficient energy for an active transmission, the data medium can, during its connection with the user's first terminal, which does have its own energy source, and can then provide also the data medium with energy and while the data medium is in the proximity of the vendor terminal and, for example, by entering a further signal by the user, effect the transfer of the amount of money contained in the further memory to the vendor terminal. In the process, the customer, i.e. the user of the data medium, has complete control not only of the amount of the money, but also of the point in time at which it is transferred.

Under certain conditions the payment procedure can be further simplified, in particular if the vendor terminal is an automatic vending machine, for example an automatic beverage machine. In this case the vendor terminal, i.e. the automatic vending machine, can be equipped so that it outputs an identification signal if a data medium is introduced or is brought into appropriate proximity. The identification signal characterizes the type of automatic machine, for example, candy vending machine or coffee vending machine, whereby simultaneously a given fixed amount of money for the goods of the automatic vending machine is defined. The data medium subsequently transfers this amount of money into the further memory without, in this special case, the customer needing to use his user terminal or entering a confirmation signal. This amount of money is subsequently automatically deducted from the further memory through the vending machine. The amount of money transferable in this way by the vending machine can be limited within the data medium to a low value so that the damage to the customer remains small in the event of a malfunction or through fraudulent manipulation a wrong identification signal is output by the vending machine and thereby a higher amount of money is deducted from the data medium than corresponds to the cost of the goods delivered by the vending machine.

A small number of vendors exist whose products are frequently used by many users. These are in particular telephone services, public transportation means, parking places subject to fees, and similar products. With such vendors the danger that erroneously or even fraudulently high amounts of money are deducted, is extremely low. Furthermore, such secure vendors frequently do not wish that each terminal associated with this vendor is provided with a memory in which the electronically transferred amounts of money are collected. According to one embodiment of the invention, therefore several further memory sections are provided into which are written greater amounts than are required for a one-time use of a particular product, wherein each memory section is associated with a particular vendor. When a user avails himself of a product, the amount of money is automatically deducted only in the associated memory section through the terminal of the secure vendor by a corresponding amount without data representing this amount being transferred from the data medium to the terminal. So that the particular vendor is nevertheless credited with an amount of money, a data set is generated in the data medium during the transfer of a relatively large amount of money from the memory into a particular further memory section and stored in a third memory section which is read out at the latest when again amounts of money are transferred from the account of the user into the data medium, e.g., at the bank or when in connection with a telephone system.

Even more favorable to particular vendors is the use of several further memory sections. In these further memory sections the amounts of money are stored in the form of value units. If a product of such a vendor is used, only one value unit or a corresponding number of value units is invalidated in the corresponding further memory section. For this purpose even less expenditures are required than is the case when decreasing a stored amount of money by a particular amount corresponding to the product of which the user has availed himself.

In particular when using public transportation, the associated vending machine (second terminal) issues tickets for the subtracted amounts or the invalidated value units. These separate tickets can be avoided if further memories are additionally provided in the data medium, into which the subtracted amounts or the invalidated value units are transferred, preferably through the vending machines of the transportation system. Moreover, through this vending machine or when passing through a barrier at the entrance to the transportation station, time of day information and information regarding the access location is written into the particular additional further memory. The data medium itself serves in this way as a travel pass since the additional further memory contains all necessary specifications of a travel pass and can be checked at any time during the trip. In the case of transportation systems which check the travel passes at the destination exit, the content of the additional further memory can then be deleted. If at the exit no check is provided, the contents of the memory, serving as a travel pass, becomes automatically invalid due to elapsed time without needing to be deleted. At the next use of the public transportation system, the associated additional further memory is simply overwritten.

The data medium can be issued by the bank at which the user has an account such that the memory of the data medium which is not accessible from outside is loaded with a particular relatively large amount of money, and when this amount of money is exhausted, the data medium is returned to the bank. However, it is considerably more favorable if the memory of the data medium can be repeatedly replenished by the user with further amounts of money. For this purpose, the user connects the data medium to a third terminal which is disposed, for example, in the offices of his bank and during the transfer of money the corresponding data are automatically transferred into the computer of the bank and the amount of money transferred to the data medium is deducted from the account of the user. Simultaneously the contents of the third memory section is automatically, i.e. without any activity on the part of the user, read out and transferred into the computer. These read data of the third memory section are used such that the amount of money which has been transferred by the user into the further memory section allocated to a particular vendor, is now also credited to this vendor. This third terminal for replenishing the memory of the data medium need not be disposed only in the offices of the user's bank but it is also conceivable that it can be accessed via a public or private telephone connection which, in known manner, can be used with a chip card. Through the appropriate operation of such card telephone, all of the data accompanying the replenishment of the data medium, such as the amount of money, designation of the bank, of the user and his account number, can be transferred via a computer of the telephone company or directly to the user's bank. This permits the user to be largely independent of the location of his bank and its branch offices since in most instances a card telephone is probably closer to the location of the user.

According to a further embodiment of the invention, the transfer of money from the internal memory of the data medium, which is loaded for example in the above described way, into a further memory section allocated to a particular vendor, can be carried out not only through the first terminal but also through the third terminal, i.e. preferably through a card telephone by means of a corresponding operation. In the process, no data specifying this transfer needs to be transferred into the third memory section of the data medium and placed there for intermediate storage; rather, these data can be transferred immediately via the third terminal, for example, directly to the computer of the vendor to whom the particular further memory section is allocated. The use of the third terminal is in particular necessary if a further memory section is to be allocated for the first time to a vendor or to a different vendor from a previously allocated vendor.

It can occur that the products of a vendor, to whom a particular further memory section is allocated, are not to be used for at least a relatively long time. This is the case, for example, if the vendor is the public transportation provider of a city and the user is absent from this city for a relatively long period of time. If, in the further memory section allocated to this vendor, money or value units are still stored, these would not be currently available to the user. In order to be nevertheless able to use such money, a further embodiment of the invention provides that the amounts of money or value units stored in such further memory section can again be transferred back to the internal money memory. This can take place with the aid of a third terminal, thus preferably with the aid of a card telephone, and the corresponding data must be relayed via this terminal so that this amount of money is again deducted from the vendor to whom the particular further memory section is allocated from which money is to be transferred back. This is necessary since, in general, the vendor had been credited with the entire amount which had previously been transferred to the further memory section allocated to that vendor. If the transfer from such further memory section back into the internal money memory takes place by means of the first terminal of the user himself, corresponding data identifying this procedure must be transferred into the third memory section so that the re-crediting of the amount, transferred back within the data medium from a further memory section into the internal money memory, can be carried out from the account of the allocated vendor when the data medium is connected the next time to a third terminal.

If from a further memory section an amount of money has been transferred back into the internal money memory, this amount can be transferred again into a further memory section allocated to another vendor.

The individual further memory sections, or at least a portion thereof, can be fixedly allocated to specific vendors; for example, one further memory section is provided for telephone value units, another further memory section for parking fees and a third further memory section for providers of public passenger transportation. Further memory sections can also be provided which can be optionally allocated to specific vendors, for example by way of specific code numbers assigned to the vendors, which code numbers can be selected by the user. However, with fixedly allocated further memory sections, the use, i.e. deduction of value units, is significantly simpler. For specific services, for example for public transportation or parking fees, various vendors of the same type of services exist which have divisional accounting, for example public transportation in different cities or regions. In the case of the fixed allocation of at least a portion of the further memory section to specific vendors, it is useful for this allocation to be for a specific type of services, i.e. a specific further memory section is for instance always allocated to public transportation. But, in order to be able to differentiate between the various vendors of the same type of services, the amounts of money or value units of the particular further memory section is provided with an identifier which indicates which specific vendor, i.e. in the example of public transportation, which city or region is associated with the value units contained in the particular further memory section. This identifier can be, for example, the postal zone code or the telephone area code of this city or region or a portion of these numbers. In order to select such specific vendor, the data medium is connected to a third terminal, i.e. preferably to a card telephone, and through appropriate operation a selectable amount of money is transferred into the particular further memory section together with the identifier assigned to the specific vendor. Simultaneously, corresponding data are transferred via the card telephone into a computer whereby this selected vendor receives a credit note about the amount of money which the value units written into the further memory represent.

The identifier need not be input by the user if a particular identifier for a specific vendor will be assumed based upon the region of operation of this specific vendor in which the connection has been made. If a further memory section already exists for that specific vendor in that region, an amount of money or number of value units will be stored in that further memory. If no such further memory exists, a new further memory will be created for that specific vendor and the appropriate identifier associated with that new further memory section. The amount of money or number of value units are then stored in the newly created further memory section. If a user wishes to remotely select a particular special vendor in a different region, the user inputs, via a third terminal, the identifier for that selected specific vendor in that other region, and thereafter, the amount of money or number of value units are stored in the corresponding further memory section or in a newly created corresponding further memory section, while the amount is credited to the account of that selected specific vendor in that other region.

If a vendor or a type of product is used only rarely or only once and if, after the last use, value units still remain, the user could forget that these value units are still available without being able to dispose of them immediately. For this reason, further identifiers representing a date, are assigned to the value units or amounts of money of at least some of the further memory sections. This date is compared, during every connection of the data medium to a third terminal, with the current date, and if this difference exceeds a given value, it can be assumed that the user at least temporarily will no longer use the associated product in the future, and the amounts of money or value units contained in this further memory section are automatically transferred back into the internal money memory as amounts of money. In this case these corresponding data are also transferred from the third terminal to a computer and these value units or amounts of money which had already been credited to a specific vendor, are again deducted from that vendor.

The invention relates further to a system for carrying out the method according to the invention with at least one portable data medium and several terminals which are equipped for carrying out the method according to the invention.

The invention further relates to portable data mediums that have a memory and a control unit suitable for carrying out the method according to the invention.

BRIEF DESCRIPTION OF THE DRAWINGS

In the following, embodiments of the invention will be explained in further detail in conjunction with the drawing, wherein.

DESCRIPTION OF THE PREFERRED EMBODIMENTS

Figure 1:
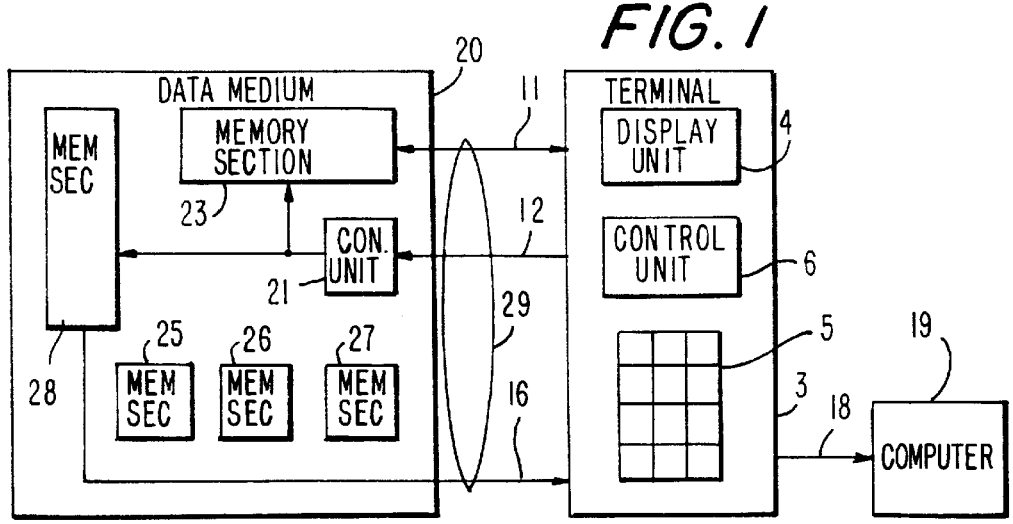
FIG. 1 is a schematic diagram illustrating the connection of a portable data medium to a terminal for transferring an amount of money into the data medium.

FIG. 1 schematically illustrates portable data medium 20 containing or carrying a number of memories or memory sections 23 and 25 to 28 as well as a control unit 21. The elements of the data medium 20 are connected to the outside via an interface 29 which here, for the sake of clarity, is shown with several lines. Data which preferably represent amounts of money can be exchanged with the memory 23 via a line 11. Control commands are sent to the control unit 21 via a line 12, and via a line 16 the contents of the memory 28 can be read out. The individual memories preferably represent memory sections of at least one uniform memory. Lines 11, 12 and 16 of the interface 29 as well as further lines, not shown, in particular for a voltage supply, in fact, do not need to be present as separate lines. Rather, several lines can be combined to one multiplex line if a data medium with several electrical contacts is assumed. In the case of a data medium for contactless data and energy transmission, all lines are preferably realized through inductive or capacitive coupling.

In FIG. 1 the data medium 20 is connected to a terminal 3, indicated schematically, which is realized, for example, by a card telephone and is connected via a connection 18 to a computer 19. This computer can also be realized by a general data processing arrangement or also by an accounting device. This connection is temporarily established by the user. The terminal 3 essentially comprises a display unit 4, a keyboard 5 and a control unit 6. Specific operation of the keyboard 5 activates the control unit 6 to transmit via connection 12, control commands to the control unit 21 of the data medium 20, whereupon it selects, via a connection 22, the memory 23 in order to exchange data representing amounts of money. In addition, memory 28 is selected to transfer its contents via line 16 to terminal 3. The amount of money or the corresponding data which are written into memory 23 are determined by the user by means of entry via keyboard 5 and output by the control unit 6 of the terminal 3 onto line 11. The display unit 4 serves to display the entered data or for the display of messages from which the user can recognize the particular following required operation. The data transferred via line 16 from the data medium to terminal 3 is processed by the control unit 6, and data derived therefrom as well as data formed from the transfer into memory 23 are sent via line 18 to the computer 19. These data sent to computer 19 cause the corresponding amount of money, which had been supplied to the data medium 20, to be deducted from the account of the owner of the data medium 20, and, in addition, the data read from memory 28 are processed. The significance of these data will be explained later.

Figure 2:
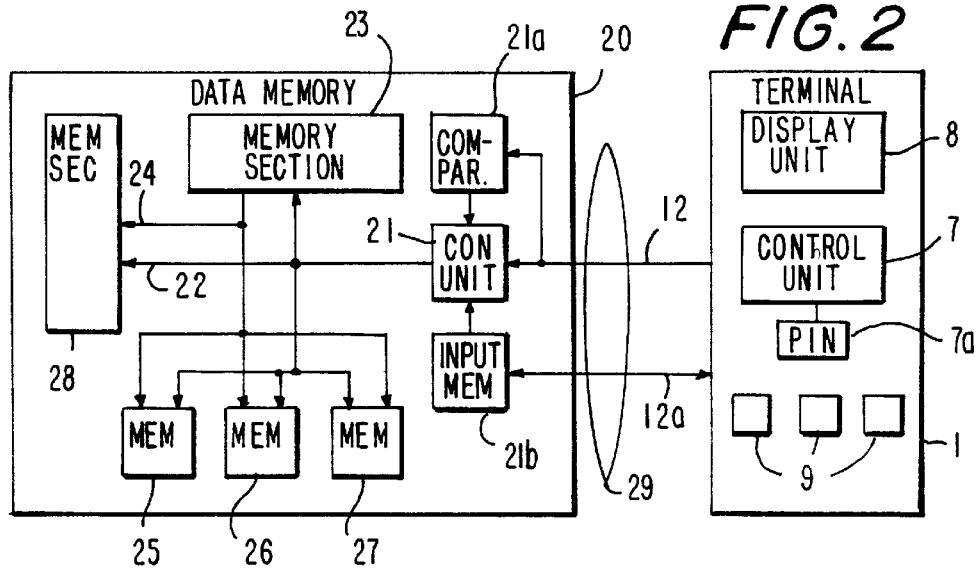
FIG. 2 is a schematic diagram illustrating the transfer of amounts of money or value units within the data medium to various memory sections in the data medium.

In FIG. 2 the data medium 20 is coupled to a terminal 1, which includes a display unit 8 as well as some keys 9, but only an extremely simple control unit 7. This terminal 1 can therefore be implemented so as to be very small, in particular, it only needs to be the size of a fraction of the area of the data medium 20 and specifically just large enough so that the contacts or the inductive coupling arrangement of the data medium can be accepted. This terminal can be fixedly assigned to the user. Terminal 1 is equipped with its own voltage supply in the form of a small battery. Through appropriate actuation of keys 9, and via connection 12 of the interface 29 the control unit 21 in the data medium 20 is selected in order to initiate the transfer of an amount of money determined for example through the contents of an input memory 21b from the memory 23 into a selectable memory section 25, 26 or 27. The specification for an amount of money selected via keys 9 of terminal 1, can be transferred via the connection 12a, shown here separately, into the input memory 21b. Furthermore, the amount of money selected via keys 9 is displayed on the display unit 8 directly or, after transfer into the input memory 21b through retransfer via connection 12a, as the contents of the input memory.

Before the transfer of the selected amount of money to data medium 20, first, a secret number can be transferred from a memory 7a in terminal 1 to the data medium 20 and supplied to a comparator 21a which comprises a memory in which also a secret number can be stored. The secret number can additionally also be encrypted or decrypted by the control units 7 or 21, respectively. Under specific conditions, in particular when connecting the data medium 20 to terminal 1 for the first time, the secret number can be transferred from the terminal into the data medium and directly or as a secret number derived from the terminal to be stored in the data medium. The comparator 21a subsequently checks whether or not the two secret numbers have a given relationship, preferably whether or not they are identical, during later repeat connections. Only if this is the case would the control unit be enabled in order to process subsequent amounts of money to be transferred into input memory 21b using terminal 1. This would further allow such amounts of money to be transferred from memory 23 to a selected memory section 25, 26 or 27.

This takes place within data medium 20 via the control connection 22 depicted schematically, which leads to memory 23 and to the memory sections 25 to 27 and which selects one of them. By selecting memory 23 the data corresponding to the desired amount of money are transferred via line 24 to the selected memory sections 25 to 27 and transferred into some of these memory sections preferably in the form of value units. Simultaneously, via control connection 22 memory 28 is selected, and to it the data output from memory 23 corresponding to the transferred amount of money are supplied and written into it. However, this is only the case if the selected memory section is fixedly allocated to a vendor. If a product of this vendor is to be used, only a corresponding amount of money is subtracted from the particular memory section or a corresponding number of value units are invalidated in the memory section. Corresponding data are changed in the memory section, however, neither the amount of money nor the value units are actually transferred to the vendor. Consequently, in such a case no money is transferred to a memory of the vendor. However, in order for the vendor to be nevertheless credited with the amount of money which was transferred into the allocated memory section, this amount is placed into intermediate storage in memory 28 and, the next time the data medium is connected preferably by a card telephone, the intermediate memory is read out via line 16, as explained in conjunction with FIG. 1. If, in contrast, the amount of money is transferred into a memory section from which a vendor transfers an amount of money directly into his own memory, intermediate storage is not required when transferring money from memory 23 to this vendor memory section.

Figure 4:
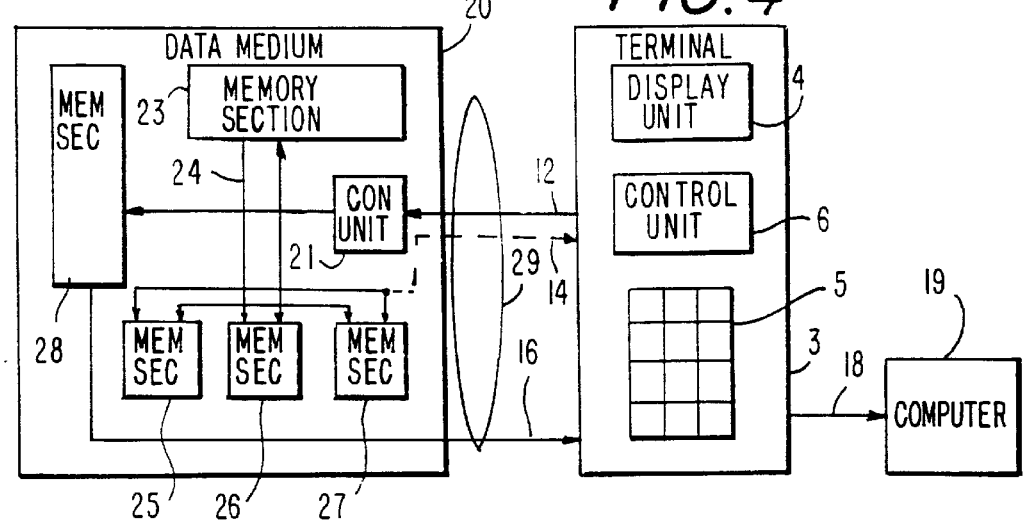
FIG. 4 is a schematic diagram illustrating the connection of data medium to a terminal which is connected to a computer for transferring value units or amounts of money into a memory section.

Referring to FIG. 4, another operation which can be achieved according to the present invention is the use of the first terminal to load a selected amount of money or selected number of credit units from the second memory 23 to one of the special vendor memories 25, 26 or 27. At the same time data is stored in third memory 28, corresponding to the amount of money or number of units loaded into the special vendor memory. Before utilizing the money or units, the user must connect the data medium 20 to a third terminal, for example, a card telephone 3 shown in FIG. 4, whereupon appropriate operations transfer the data from third memory 28 corresponding to the amount of money or units in the vendor memory, to the central computer 19, through the third terminal 3, thereby crediting that vendor. A signal either from the third terminal or from the computer or from the control unit of the data medium, validates and permits future use of the money or credits loaded into the vendor memory, when the data medium is thereafter attached to a special vendor terminal.

The control unit 21 must thus control a sequence of functions and, with different applications such as the connection to terminal 3 in FIG. 1, control different sequences of functions so that the control unit 21 is usefully implemented as a program-driven microprocessor with associated program memories. This comprises a number of sub-programs which are assigned to the different sequences of functions. Subsequently, through the control commands transferred from a terminal fixedly assigned sub-programs are called up so that the control commands can be very simple and in particular the terminal 1 needs only to be constructed to be correspondingly simple so that the actuation of a particular key is nearly directly only assigned to a specific control command. The function procedure initiated by actuating a specific key is thus determined exclusively through the program in the data medium. It is thereby possible to operate different data mediums that are assigned, for example, to different vendors or groups of vendors, with the same terminal and the actuation of the same key in different data mediums can enable different functions. It is favorable if the display 8 of terminal 1 is driven by the data medium at the time it is connected so that the user recognizes from the displayed information which type of data medium he is currently using. It is readily possible to assign to the same key of the terminal, sequentially different functions. For example, at the start, after connection with data medium is established, a key can be pressed to select a specific vendor. After this selection, an amount of money can be selected with the same key, etc. This is possible by displaying the assignment of the key on the display, and through the corresponding mechanical structure of the terminal, as will be explained later in further detail.

Figure 3:
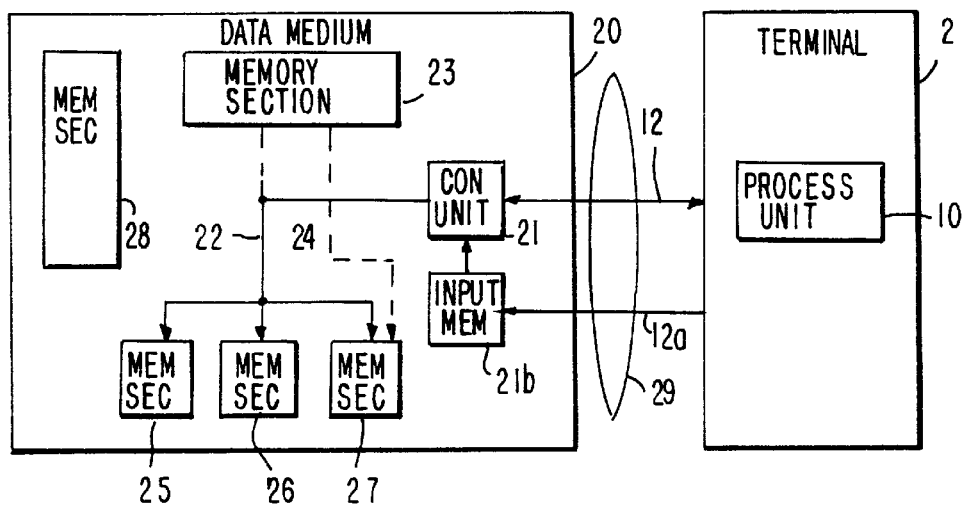
FIG. 3 is a schematic diagram illustrating the erasing of value units in one of the memory sections through a terminal of a vendor.

FIG. 3 schematically shows the case in which the user wants to avail himself of a product and connects the data medium 20 to a vendor terminal 2. This terminal 2 is shown entirely schematically with only one processing unit 10; further elements, such as a possible display unit and keyboard, have been omitted for the sake of clarity. If terminal 2 belongs to a vendor to which a memory section is fixedly allocated, for example a public transportation operation, terminal 2 transfers only control signals via line 12 to the control unit 21, through which preferably value units in the allocated memory section are invalidated. If, however, it is any vendor who would like to transfer a specific amount of money from the data medium 20, the control unit 21 is correspondingly selected and subtracts this amount of money from the amount of money available in the memory section which is provided for such optional vendors, for example, that available in memory section 27, and the control unit 21 transfers this amount of money via connection 12 to terminal 2, as is indicated through the corresponding arrow of connection 12. Access to the memory 23, in general comprising a greater amount of money, is not possible due to the corresponding structure of the data medium, in particular of control unit 21.

In order to prevent an unintentionally or fraudulently high amount of money from being transferred to terminal 2, only that amount of money is usefully contained in memory section 27 which has been authorized by the user of the data medium, for example, by having previously, through the corresponding operation of user terminal 1, transferred only the desired amount of money from memory 23 to the memory section 27, as has been described in conjunction with FIG. 2. A still simpler possibility for use resides in that first the data medium 20 is connected to terminal 2, either via contacts or, more favorably, in a contactless manner in order to transfer from terminal 2 via a connection 12a the desired amount of money into the input memory 21b. This can be initiated by operating the terminal 2 or automatically in that the memory section 27, from which the terminal 2 seeks to deduct the amount of money, is empty or contains too low an amount of money. After the input memory 21b has been written, the user of the data medium 20 connects it to user terminal 1, as was described in conjunction with FIG. 2, and the amount of money specified by the input memory is displayed on the display unit 8 of the terminal 1. By entering a simple confirmation signal the amount of money specified by the input memory is transferred from memory 23 into memory section 27. The user subsequently connects the data medium 20 again with terminal 2 after separating the data medium from terminal 1, so that via contacts a connection can be established. Another possibility resides in that the user does not separate the data medium from terminal 1 but brings the medium and terminal together into the proximity of terminal 2, and the data medium 20 actively transfers the amount of money contained in memory section 27 to terminal 2 contactlessly and with the aid of the battery in terminal 1. If the data medium 20 is itself equipped with a battery, the terminal 1 can also be omitted for contactless transfers.

With specific terminals 2, namely if these are automatic vending machines such as for candy or drinks, an exception can be made from the principle that a terminal 2 has not even indirect access to memory 23. If the data medium 20 is connected to such a terminal 2 and does not contain a sufficient amount of money in memory section 27, terminal 2 transfers an identification signal via the connection 12 to the data medium 20, and the control unit 21 thereupon initiates the transfer of a specific amount of money determined by the identification signal from memory 23 into memory section 27, as is indicated by the dashed lines 22 and 24, and now the terminal 2 can transfer this amount of money from data medium 20 and can deliver the goods. Since the maximum amount of money allowed to be transferred is determined by the control unit 21 of data medium 20 and such amount of money for such automatic vending machines are only small, the user can incur only slight losses even in the event of a potential error.

FIG. 4 schematically shows the way in which an amount of money is transferred from memory 23 of the data medium 20 into one of the selectable memory sections 25 to 27 with the aid of a terminal 3, realized by a card telephone or like device. Upon the corresponding operation of the keyboard 5, the control unit 6 of terminal 3 generates control data which are transmitted via connection 12 to the control unit 21 of the data medium 20. As was described in conjunction with FIG. 2, the control unit 21 similarly selects, via connection 22 the memory 23 and one of the memory sections 25 to 27. From memory 23 via the connection 24 within the data medium 20, the desired amount of money corresponding to the data transferred via connection 12, is transferred into the memory section 25 to 27 selected. It is not required in this case that this transfer is written into memory 28 since the corresponding data can be directly transferred from terminal 3 via connection 18 to the computer 19, or the corresponding amount of money is transferred from the data medium 20 via the connection 14, shown in dashed lines, to terminal 3 in order to form therein the corresponding data for transfer to the computer 19.

From the control unit 21 via connection 22 the memory 28 is additionally selected and its contents transferred via line 16 to terminal 3. It is possible that since the last connection of the data medium 20 to a terminal 3, a transfer within the data medium had taken place with the aid of terminal 1, as has been described in conjunction with FIG. 2, and corresponding data have been written into memory 28. The data in memory 28 are deleted as soon as they have been read out via line 16.

In certain cases where the special vendor, whether it is a transportation authority, parking authority or other special vendor, does not wish to permit the user to use the vendors services until after the vendor has received advanced payment, the user can use terminal one to allocate amounts of money or credit units to the special vendor, for example by storing the required information in a portion of memory 28. At this point, the data medium may not yet be used for the particular service. The next time the data medium is connected to the third terminal three, the data concerning crediting of the special vendor is transferred from memory 28 over line 16 and through the terminal three, to computer 19 which can then be used to credit the special vendor with the amount of money or number of credit units which were previously stored by the user in memory 28. This releases this amount of money or a number of credit units to the special vendor's account and at the same time loads a further memory section corresponding to that selected vendor with the same amount of money or same number of value units. Thereafter, the data medium can be used with the terminal of that special vendor to utilize the services of that vendor.

Although in the drawings, a single second memory or memory section 23 has been shown, which is connected to at least one first memory or memory section, it should be understood that the invention includes the possibility of having more than one second memory each with its set of first memory sections, on a single data medium.

Figure 5:
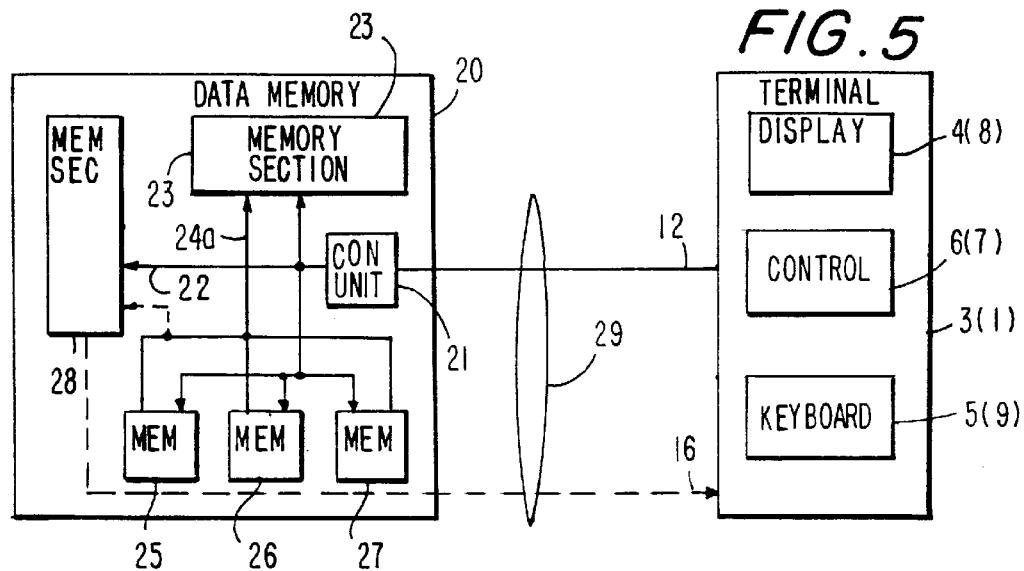
FIG. 5 is a schematic diagram illustrating the connection of data medium to a terminal to transfer back value units from a memory section into the internal money memory.

FIG. 5 schematically depicts the way in which money or value units are transferred back from one of the selection memory sections 25 to 27 into memory 23. This can take place with the aid of a terminal 3, i.e. of a card telephone with a display unit 4, shown schematically, and a keyboard 5 as well as a processing unit 6, or also by means of a terminal 1 with a display unit 8, also shown schematically, a keyboard 9 and a processing unit 7. The comparator 21 as shown in FIG. 2 is here omitted since it is not required for this procedure. Through appropriate operation of the keyboard 5 or 9, respectively, appropriate control signals are transmitted via line 12 to the control unit 21 of the data medium 20. This selects correspondingly via connection 22 the memory 23 and one of the memory sections 25 to 27, and via the connection 24a data are now transferred to memory 23 and written into it. If this transfer takes place through terminal 1, the corresponding data which indicate the transfer must be written into memory 28 as is indicated by the dashed line. On the other hand, if this transfer had been initiated via a terminal corresponding to a card telephone, no corresponding data needs to be written into memory 28 since these data can be generated by the processing unit 6 which, through appropriate control commands via line 12 has initiated the corresponding transfer procedure in the data medium 20. A simpler control potentially results if the data are transferred in each case into memory 28, since this memory is read out via the connection 16 depicted by dashed lines, when the data medium 20 is connected with a card telephone.

Figure 6:
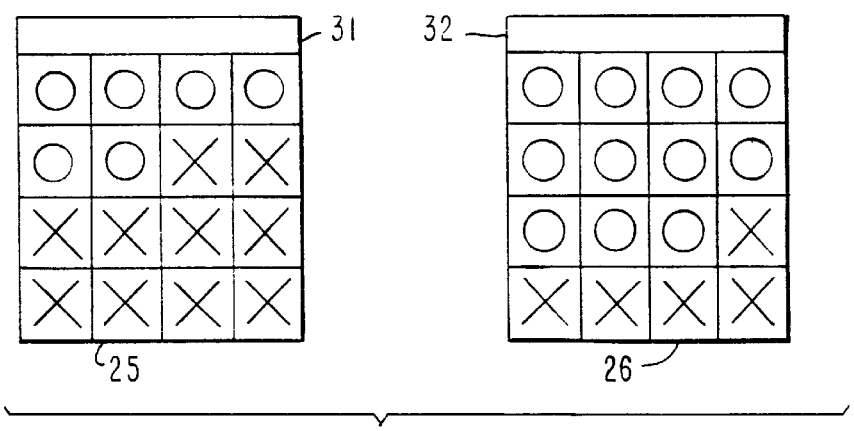
FIG. 6 is a schematic diagram illustrating two memory sections containing partially decremented value units and which are provided with an identification.

FIG. 6 schematically indicates the contents of two memory sections 25 and 26. It is assumed for the sake of simplicity that the memories do not contain amounts of money but rather value units. Both memory sections 25 and 26 contain in this example sixteen value units. It is understood that in practice the actual number can be greater. Amounts of money or value units may actually be stored in the memories in the form of coded information. Each value unit is depicted by a square field. Fields containing an x represent exhausted value units while the fields denoted by o represent value units which have not yet been exhausted.

The memory section 25 further contains a field 31, and the memory section 26 contains a field 32, and in these fields are contained identifiers which apply to the entire memory. In particular, this field indicates the vendor to whom the particular memory is allocated. If the data medium is connected to the terminal of a vendor, a validation is first carried out to determine whether or not one of the memories contains in its identification field, the identifier for the particular vendor. If this is not the case, the desired product is not approved.

Figure 7:
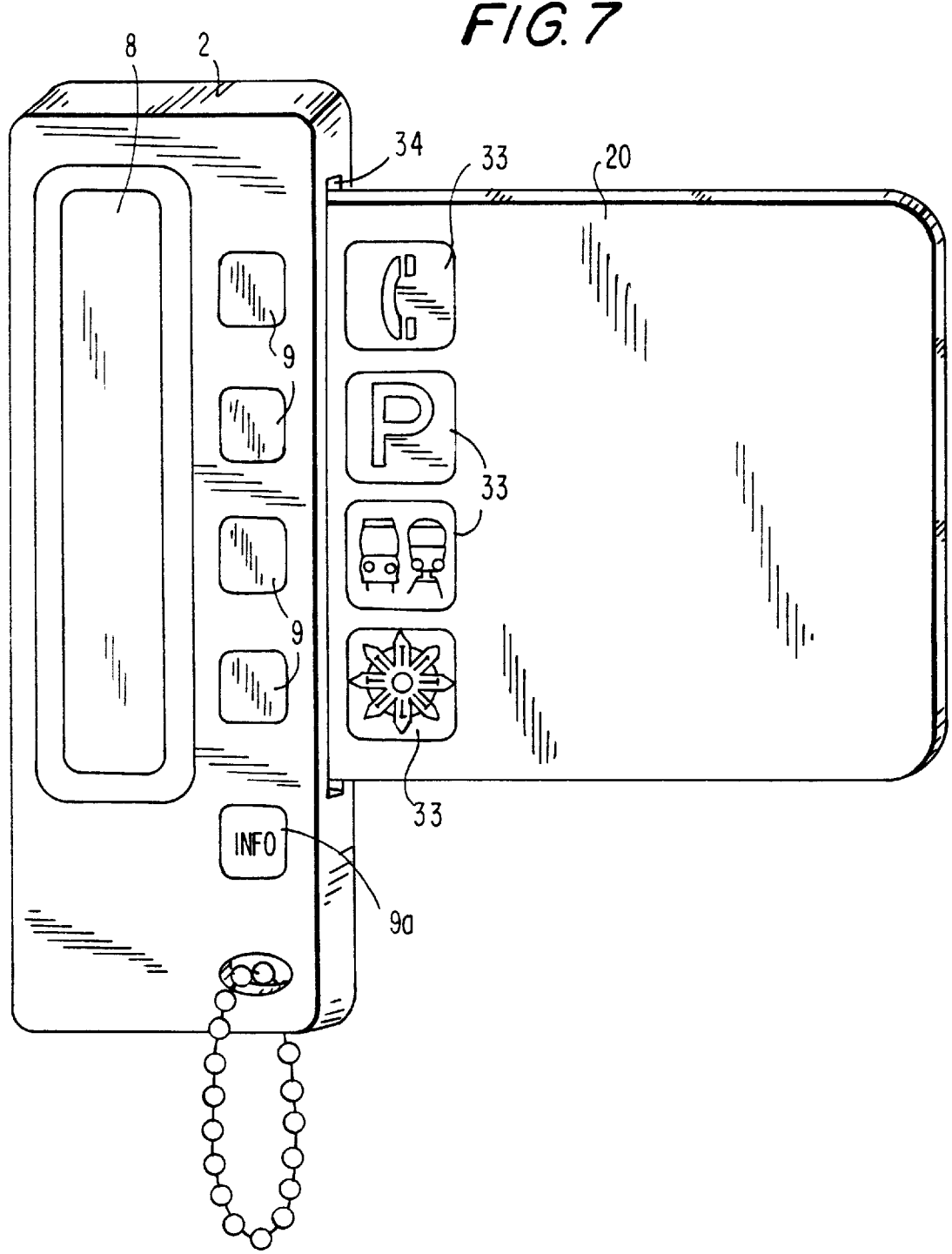
FIG. 7 is a perspective view of an embodiment of a personal terminal with data medium according to the invention.

Fields 31 and 32 can contain further identifiers, however, in particular the specification of a date. This is preferably the date on which a change was carried out last in the memory, thus for example a value unit was invalidated or new value units were written in. If the data medium 20, as is for example shown in FIG. 7, is connected to a terminal 3, this terminal transfers also the current date to the control unit 21. If the difference between this current data and the data contained in field 31 or 32 exceeds a given value, the control unit 21 can initiate specific processes. The control unit 21 can, for example, read out the remaining value units contained in such memory with a sufficiently long expired date and transfer them as amount of money into memory 23. This builds on the assumption that a user, who has not availed himself of products of a specific vendor for a relatively long time, will probably not do so in the near future so that he can subsequently again freely dispose of the remaining credit balance for such vendor.

FIG. 7 depicts a concrete embodiment of a user terminal 1 with which it is possible to transfer amounts of money or value units from an internal memory into an externally accessible further memory. This terminal 1 has an elongated shape and comprises a display unit 8 as well as four keys 9 and a further key 9a. Further, a slot 34 is provided into which data medium 20 can be introduced which has the customary format of a credit, debit, special purpose or check card. Terminal 1 further comprises an energy source in the form of a battery, which is not shown, and can be disposed in the lower region of the unit. The keys 9 here carry no designation, instead designations 33 are printed onto the data medium 20 which, after introduction of the data medium 20 into terminal 1, come to lie adjacent keys 9. The designation or the symbol, respectively, in the upper field indicates a telephone, and via the adjacent keys 9 one or several blocks of value units can be transferred from the internal memory of data media 20 into a further memory from which, when using a card telephone, value units are deducted or invalidated. Correspondingly, the designation in the next field indicates that with the associated key value units can be written into a further memory in order to pay fees for using a parking space. The designation in the third field indicates that the adjacent key serves for the purpose of loading a further memory in the data medium in which, when using public transportation, value units are invalidated.

With the aid of key 9a various functions can be controlled. Mainly key 9a is pressed to send the confirmation signal but it can be used for other functions, for example, re-crediting value units or the corresponding amount of money into the internal memory of data medium 20 upon the additional actuation of the corresponding key 9.

Since keys 9 are not provided with a designation, but rather these designations are applied on the data medium 20, it is possible with the aid of terminal 1 to use various types of data medium 20 with memories for various types of products of various vendors with the same terminal.

Figure 8:
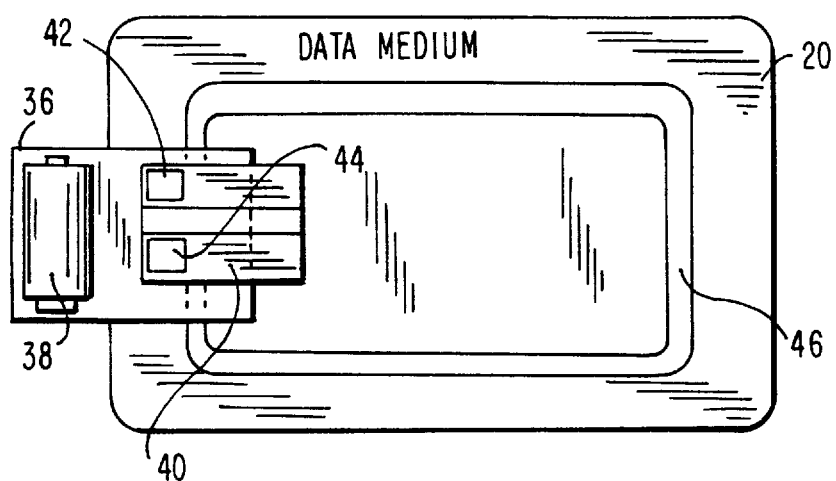
FIG. 8 is a schematic diagram illustrating another feature of the invention.

FIG. 8 illustrates another feature of the invention which includes a data medium or card 20 having a chip 40 containing for example, a control unit in the form of a microprocessor and one or more memories according to the invention or according to the prior art. Chip 40 includes a pair of contacts 42 and 44 which are normally used to galvanically engage contacts in a second terminal, which may be a vendor terminal, an automatic teller machine for a bank, or any other type of mechanism which is capable of interacting with the chip 40. Data medium 20 also carries an antenna loop 46 or other contactless means which permits communication with the chip in a contactless way. These types of contactless engagements are known and include a close coupling where the card is brought into physical contact with a surface. Loop or other means 46 also permit operation through a loose coupling, for example, simply by waiving the card through a specified area. It is known that microprocessors currently available which have a chip 40, must have a minimum amount of power to operate. The operations of the microprocessor can be divided into active processes which require higher energy and passive operations that can operate on very low energy. An example of a passive process is the reading of a memory, while an example of an active process is the changing of the contents of a memory. It is known that with current technology, chip 40 can only be powered sufficiently for active operations by use of galvanic contacts 42 and 44 or, in some cases, by a close coupling through the contactless loop 46. Only passive processes are possible if loose coupling is used through loop 46 since there is insufficient energy available to operate the active processes through the loose coupling. According to the invention, a first terminal 36 can be provided which has a battery 38 or other onboard power supply and which also includes contacts for galvanically connecting to contacts 42 and 44 of chip 40. The purpose of first terminal 36 is solely to power chip 40 so that it can operate active processes even when communication between the data medium 20 and the vendor terminal or other appropriate terminal is solely through the loose coupling of loop 46. The main object of this aspect of the invention is to permit the use of loose coupling for a data medium while active power consuming operations can still be achieved in chip 40 through the use of the first terminal 36 which is engaged to the data medium, for example by inserting an edge of the data medium adjacent the contacts 42, 44 into a slot in the terminal 36. The first terminal 1 in FIG. 2 can also be used for powering the card in this way.

While a specific embodiment of the invention has been shown and described in detail to illustrate the application of the principles of the invention, it will be understood that the invention may be embodied otherwise without departing from such principles.

What is claimed is:

1. A method for paying for products including goods and services of vendors, by means of a portable data medium having a memory with a plurality of memory sections, the method comprising:

providing at least one first memory section and a second memory section for receiving data representing an amount of money;

operatively connecting the data medium to a first terminal;

using the first terminal to deduct, as a function of a first operation of the first terminal, a selected amount of money from the second memory section and to write the selected amount into the at least one first memory section;

for receiving a product of a vendor, operatively connecting the data medium to a second terminal and deducting only from the at least one first memory section, the selected amount of money;

providing an unique, irreversible and checkable relationship between the data medium and the first terminal by storing in the data medium a first secret information, and by storing in the first terminal a second secret information;

transferring the second secret information from the first terminal into the data medium;

determining in the data medium that a relationship between the first and second secret information exists;

thereafter permitting the selected amount to be deducted from the second memory section and written into the at least one first memory section; and only during a first initial connection of the data medium to a first terminal, transmitting the first secret information to the first terminal, and creating the second secret information in the first terminal for a first time.

2. A method as stated in claim 1, including transmitting the first secret information only if previously a further secret information is entered into the first terminal.

3. A method as stated in claim 1, wherein, during a subsequent connection of a data medium with another first terminal, following the first initial connection of the data medium with the first-mentioned first terminal, the first secret information is only transferred from the data medium if previously a further secret information is entered, and after a selected number of times that the data medium is connected to other first terminals and the further secret information is entered, the first secret information is no longer transferred at all.

4. A method for paying for products including goods and services of vendors, by means of a portable data medium having a memory with a plurality of memory sections, the method comprising:

providing at least one first memory section and a second memory section for receiving data representing an amount of money;

operatively connecting the data medium to a first terminal;

using the first terminal to deduct, as a function of a first operation of the first terminal, a selected amount of money from the second memory section and to write the selected amount into the at least one first memory section;

for receiving a product of a vendor, operatively connecting the data medium to a second terminal and deducting only from the at least one first memory section, the selected amount of money; and providing an input memory in the data medium, in which data specifying an amount of money can be entered, and after establishing an operational connection between the data medium and the first terminal, displaying the amount of money specified in the input memory and, after a confirmation signal is supplied from the first terminal, this amount of money is transferred from the second memory section into the at least one or into a selected first memory section.

5. A method as stated in claim 4, wherein after establishing an operational connection between the data medium and the second terminal, and through the second terminal, a specific amount of money is written into the input memory.

6. A method for paying for products including goods and services of vendors, by means of a portable data medium having a memory with a plurality of memory sections, the method comprising:

providing at least one first memory section and a second memory section for receiving data representing an amount of money;

operatively connecting the data medium to a first terminal;

using the first terminal to deduct, as a function of a first operation of the first terminal, a selected amount of money from the second memory section and to write the selected amount into the at least one first memory section; and for receiving a product of a vendor, operatively connecting the data medium to a second terminal and deducting only from the at least one first memory section, the selected amount of money;

providing a plurality of said first memory sections of which at least two are respectively allocated to different vendors;

selecting the first memory section into which amounts of money are written at a third terminal or when the data medium is connected to the first terminal;

writing into at least one of the first memory sections, amounts of money in the form of data representing value units and for utilizing a product of a specific vendor through the second terminal, value units being invalidated in the first memory section allocated to the specific vendor in that corresponding data are altered; and storing in a third memory section a transfer of data identifying value units, the vendor allocated to the first memory section and a corresponding amount of money.

7. A method for paying for products including goods and services of vendors, by means of a portable data medium having a memory with a plurality of memory sections, the method comprising:

providing at least one first memory section and a second memory section for receiving data representing an amount of money;

operatively connecting the data medium to a first terminal;

using the first terminal to deduct, as a function of a first operation of the first terminal, a selected amount of money from the second memory section and to write the selected amount into the at least one first memory section; and for receiving a product of a vendor, operatively connecting the data medium to a second terminal and deducting only from the at least one first memory section, the selected amount of money;

bring the data medium into operational connection with a third terminal in order to transfer through a first operation of the third terminal, data representing an amount of money from the third terminal into the second memory section and corresponding data into a computer connected with the third terminal, and, independently of the operation of the third terminal, in order to read a contents of the third memory section via the third terminal and transfer it to the computer; and through a second operation of the third terminal, data representing an amount of money are transferred from the second memory section, into a selectable first memory section and data identifying such transfer are transferred via the third terminal to the computer connected therewith.

8. A method for paying for products including goods and services of vendors, by means of a portable data medium having a memory with a plurality of memory sections, the method comprising:

provof money; iding at least one first memory section and a second memory section for receiving data representing an amount operatively connecting the data medium to a first terminal;

using the first terminal to deduct, as a function of a first operation of the first terminal, a selected amount of money from the second memory section and to write the selected amount into the at least one first memory section; and for receiving a product of a vendor, operatively connecting the data medium to a second terminal and deducting only from the at least one first memory section, the selected amount of money;

bring the data medium into operational connection with a third terminal in order to transfer through a first operation of the third terminal, data representing an amount of money from the third terminal into the second memory section and corresponding data into a computer connected with the third terminal, and, independently of the operation of the third terminal, in order to read a contents of the third memory section via the third terminal and transfer it to the computer; and through a third operation of the third terminal the amount of money contained in a first memory section are deducted and stored in a form of an amount of money in the second memory section and data identifying this procedure are transferred via the third terminal to the computer connected therewith.

9. A method for paying for products including goods and services of vendors, by means of a portable data medium having a memory with a plurality of memory sections, the method comprising:

providing at least one first memory section and a second memory section for receiving data representing an amount of money;

operatively connecting the data medium to a first terminal;

using the first terminal to deduct, as a function of a first operation of the first terminal, a selected amount of money from the second memory section and to write the selected amount into the at least one first memory section; and for receiving a product of a vendor, operatively connecting the data medium to a second terminal and deducting only from the at least one first memory section, the selected amount of money;

bring the data medium into operational connection with a third terminal in order to transfer through a first operation of the third terminal, data representing an amount of money from the third terminal into the second memory section and corresponding data into a computer connected with the third terminal, and, independently of the operation of the third terminal, in order to read a contents of the third memory section via the third terminal and transfer it to the computer; and through a second operation of the first terminal an amount of money contained in a first memory section is deducted and stored in the second memory section and into the third memory section data are written which identify this procedure.

10. A method as stated in claim 9, wherein at least one of the first memory sections comprises a further identifier which represents a date and which is updated with every change of the contents of the particular first memory section and which, when the data medium is brought into operational connection with a third terminal, is compared with the current date, and, when a selected difference between the current date and the date according to the further identifier is exceeded, the amount of money of the particular first memory section is deducted and transferred into the second memory section and data identifying this transfer are transferred via the third terminal to the computer connected therewith.

11. A method for paying for products including goods and services of vendors, by means of a portable data medium having a memory with a plurality of memory sections, the method comprising:

providing at least one first memory section and a second memory section for receiving data representing an amount of money;

operatively connecting the data medium to a first terminal;

using the first terminal to deduct, as a function of a first operation of the first terminal, a selected amount of money from the second memory section and to write the selected amount into the at least one first memory section; and for receiving a product of a vendor, operatively connecting the data medium to a second terminal and deducting only from the at least one first memory section, the selected amount of money;

bring the data medium into operational connection with a third terminal in order to transfer through a first operation of the third terminal, data representing an amount of money from the third terminal into the second memory section and corresponding data into a computer connected with the third terminal, and, independently of the operation of the third terminal, in order to read a contents of the third memory section via the third terminal and transfer it to the computer; and at least one first memory section having one of several identifiers stored therein, which are assigned to various vendors of the same type of products and, depending on the operation of the third terminal, a selected amount of money is deducted from the second memory section and stored with the identifier in the first memory section and data specifying this procedure is transferred via the third terminal into the computer connected therewith.

12. A method for paying for products including goods and services of vendors, by means of a portable data medium having a memory with a plurality of memory sections, the method comprising:

providing at least one first memory section and a second memory section for receiving data representing an amount of money;

operatively connecting the data medium to a first terminal;

using the first terminal to deduct, as a function of a first operation of the first terminal, a selected amount of money from the second memory section and to write the selected amount into the at least one first memory section; and for receiving a product of a vendor, operatively connecting the data medium to a second terminal and deducting only from the at least one first memory section, the selected amount of money;

the step of using the first terminal to deduct the selected amount of money from the second memory section and to write the selected amount of money into the at least one first memory section operating to provisionally allocate the selected amount of money to the at least one first memory section;

operatively connecting the data medium to a third terminal for crediting the selected amount of money to a special vendor corresponding to the at least one first memory section; and after the crediting of the selected amount of money to the special vendor, releasing the provisionally allocated amount of money in the at least one first memory section for permitting the deducting of money from the at least one first memory section when the data medium is connected to a second terminal corresponding to the special vendor.

13. A system for secure payments to vendors, comprising:

at least one portable data medium including a control unit and a memory with a plurality of memory sections connected to the control unit, the memory sections including at least one first memory section and only one second memory section; and a plurality of terminals each for connection to said data medium for exchanging information between said data medium and a terminal, the terminals including at least one first terminal which is equipped to connect, during a first operation of the first terminal, to the control unit of the data medium, to change data representing amounts of money in the second memory section and in one of the first memory sections which is related to the second memory during the first operation, the terminals including second terminals which are equipped to connect to the control unit of the data medium to only change the data of the at least one first memory section, without being capable of changing the data of the second memory section;

the data medium comprising an input memory and the first terminal being equipped to control the control unit of the data medium to transfer an amount of money corresponding to contents of the input memory from the second memory section into the selected first memory section.

14. A system for secure payments to vendors, comprising:

at least one portable data medium including a control unit and a memory with a plurality of memory sections connected to the control unit, the memory sections including at least one first memory section and only one second memory section; and a plurality of terminals each for connection to said data medium for exchanging information between said data medium and a terminal, the terminals including at least one first terminal which is equipped to connect, during a first operation of the first terminal, to the control unit of the data medium, to change data representing amounts of money in the second memory section and in one of the first memory sections which is related to the second memory during the first operation, the terminals including second terminals which are equipped to control to the control unit of the data medium to only change the data of the at least one first memory section, without being capable of changing the data of the second memory section;

the memory of the data medium comprising several first memory sections and each first terminal being equipped to write, as a function of an operation of the first terminal, into a first selected memory section, a change of value units, the control unit of the data medium being equipped to write data identifying said change into a third memory section; and at least one second terminal being equipped to change data only in a first memory section which is allocated to a particular vendor.

15. A system as stated in claim 14, including a computer and at least one third terminal connected to the computer, the third terminal operating so that the data medium can be connected thereto in order to control, during a first operation of the third terminal, to the control unit of the data medium in order to transfer and write data representing amounts of money from the computer connected to the third terminal, into the second memory section as well as to transfer data from the third memory section into the computer.

16. A system as stated in claim 15, wherein, during a second operation of the third terminal the control unit of the data medium is controlled to change data in the second memory section and in a selected first memory section related to the second memory section, and to transfer data specifying this change via the third terminal into the computer connected to the third terminal.

17. A system as stated in claim 15, wherein, during a second operation of the third terminal, the control unit of the data medium is triggered to change mutually dependent data in the second memory section and in a selected first memory section and to transfer data specifying this change via the third terminal into the computer connected to the third terminal.

18. A portable data medium for a system and method for secure payments to vendors, comprising:

a control unit;

a memory with at least one first memory section and only one second memory section connected to the control units;

an interface to the outside which is coupled with the memory and with the control unit in order to supply data representing amounts of money to the memory and to supply control commands to the control unit;

the control unit being equipped, upon receiving a first control command, to change data representing amounts of money only in a first memory section, and upon receiving a second control command, to deduct data representing amounts of money from the second memory section and to write them into a first memory section, the control unit being equipped so that upon receiving a third control command from the interface, the control unit writes data representing amounts of money and supplied via the interface, into the second memory section; and an input memory for receiving data specifying an amount of money, the control unit being equipped to deduct, upon being supplied with the second control commands, data corresponding to the contents of the input memory from the second memory section and to write them into one of the first memory sections.

19. A portable data medium for a system and method for secure payments to vendors, comprising:

a control unit;

a memory with at least one first memory section and only one second memory section connected to the control units;

an interface to the outside which is coupled with the memory and with the control unit in order to supply data representing amounts of money to the memory and to supply control commands to the control unit;

the control unit being equipped, upon receiving a first control command, to change data representing amounts of money only in a first memory section, and upon receiving a second control command, to deduct data representing amounts of money from the second memory section and to write them into a first memory section, the control unit being equipped so that upon receiving a third control command from the interface, the control unit writes data representing amounts of money and supplied via the interface, into the second memory section; and wherein the memory comprises several first memory sections and a third memory section and the control unit equipped to change data in a first memory section selected by the first control command and to write data representing value units into a first memory section selected by the second control command and to write data identifying this procedure as a function of the second control commands into the third memory section or to output them via the interface, and, upon being supplied with a fourth control command, to read the data from the third memory section and output the data via the interface.

20. A portable data medium as stated in claim 19, wherein the control unit is equipped to deduct, upon being supplied with a fifth control command, value units in a first memory section selected by the fifth control command and to write data representing an amount of money into the second memory section and to write data identifying this procedure as a function of the fifth control command into the third memory section or to output them via the interface.

* * * * *